(12) United States Patent
Khawand

(10) Patent No.: US 12,677,112 B2
(45) Date of Patent: Jul. 7, 2026

(54) MENULESS OPERATIONS USING SPATIALLY AWARE TAGS WITH 3D VIRTUAL GEO-FENCING

(71) Applicant: Microsoft Technology Licensing, LLC, Redmond, WA (US)

(72) Inventor: Charbel Khawand, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 392 days.

(21) Appl. No.: 18/331,928

(22) Filed: Jun. 8, 2023

(65) Prior Publication Data

US 2024/0414499 A1 Dec. 12, 2024

(51) Int. Cl.
*H04W 4/02* (2018.01)
*H04W 4/021* (2018.01)

(52) U.S. Cl.
CPC ........... *H04W 4/027* (2013.01); *H04W 4/021* (2013.01)

(58) Field of Classification Search
None
See application file for complete search history.

(56) References Cited

U.S. PATENT DOCUMENTS

2016/0286625 A1 9/2016 Olsen
2019/0384409 A1 12/2019 Omer
2023/0217215 A1* 7/2023 Russell ................. H04W 48/16
455/456.3
2023/0398435 A1* 12/2023 Dorn ........................ A63F 13/26

FOREIGN PATENT DOCUMENTS

CN 113342162 A 9/2021

OTHER PUBLICATIONS

International Preliminary Report on Patentability received for PCT Application No. PCT/US2024/031327, mailed on Dec. 18, 2025, 09 pages.
International Search Report and Written Opinion received for PCT Application No. PCT/US2024/031327, mailed on Sep. 12, 2024, 12 pages.

* cited by examiner

*Primary Examiner* — Frantz Bataille
(74) *Attorney, Agent, or Firm* — Foley IP Law, PLLC

(57) ABSTRACT

The disclosure herein describes enabling menuless operations using spatially aware tags with virtual geo-fenced boundaries. A tag manager implemented on a processor obtains movement data associated with an ultrawide band (UWB) enabled initiator device within a selected geo-fenced zone. The movement data is generated by one or more UWB enabled responder(s) within the selected geo-fenced zone. The movement data includes data describing 3D movements of the initiator device within the selected geo-fenced zone. A tag manager identifies a sequence of 3D movements of the initiator device using the movement data. The tag manager maps the sequence of 3D movements to zone-specific and/or user-specific action(s) using a menuless operations mapping table. The tag manager triggers a target computing device within the selected geo-fenced zone to perform the matched action(s). The target computing device can include an internet of things (IoT) device, a computing device, or the initiator device itself.

20 Claims, 8 Drawing Sheets

100

200

300

| MAPPING TABLE 122 | |
| --- | --- |
| SEQUENCE OF 3D MOVEMENTS 402 | ACTION(S) 404 |
| UP-DOWN-LEFT | GEO-FENCE MODIFICATION MODE |
| DOWN-LEFT-RIGHT | TURN ON IoT DEVICE |
| CIRCLE THEN DOWN | WRITE MODE |

DETECT INITIATOR DEVICE
ENTERING GEO-FENCED ZONE
502

MONITOR MOVEMENTS
504

GENERATE MOVEMENT DATA
506

TRANSMIT MOVEMENT DATA TO
TAG MANAGER
508

IDENTIFY SEQUENCE OF 3D MOVEMENTS
702

IDENTIFY PARAMENTERS INCLUDING ZONE, USER, MODE, AND/OR TIME PERIOD
704

MATCH SEQUENCE OF 3D MOVEMENTS TO USER-CONFIGURATED ACTION(S) USING PARAMETERS
706

GENERATE INSTRUCTIONS TO TRIGGER TARGET COMPUTING DEVICE TO PERFORM THE ACTION(S)
708

MENULESS OPERATIONS USING SPATIALLY AWARE TAGS WITH 3D VIRTUAL GEO-FENCING

BACKGROUND

Users wishing to initiate a function or command in a computing device or other Internet of Things (IoT) device typically utilize a keyboard, mouse, or other input device to manually type commands and initiate operations on the device. In some examples, the user utilizes a graphical user interface (GUI) or menu to select commands or otherwise initiate operations on the computing device. For example, creating a geo-fenced area frequently requires the user to utilize a keyboard or touch screen menu options to open an application on a computer and then draw or otherwise create and/or modify the geo-fence boundaries using the keyboard or other input device at the computer. However, this can be a slow, inconvenient, and time-consuming process lacking in flexibility for users.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for enabling menuless operations using spatially aware tags with virtual geo-fenced boundaries. A tag manager implemented on a processor obtains movement data associated with a UWB enabled initiator device within a selected geo-fenced zone from one or more UWB enabled responder devices. The tag manager identifies a sequence of three-dimensional (3D) movements of the initiator device within the selected geo-fenced zone using the movement data. The tag manager maps the sequence of 3D movements of the initiator device to a zone-specific predefined action using a mapping table. The tag manager triggers a target computing device within the selected geo-fenced zone to perform the mapped action(s). The target computing device can include a user device within the geo-fenced zone, an internet of things (IoT) device and/or the initiator device itself.

Corresponding reference characters indicate corresponding parts throughout the drawings. In FIGS. 1 to 8, the systems are illustrated as schematic drawings. The drawings may not be to scale.

BRIEF DESCRIPTION OF THE DRAWINGS

FIG. 4 is an exemplary block diagram illustrating a mapping table used to map a series of initiator device movements to one or more user-configurable operations.

Corresponding reference characters indicate corresponding parts throughout the drawings.

DETAILED DESCRIPTION

Figure 1:
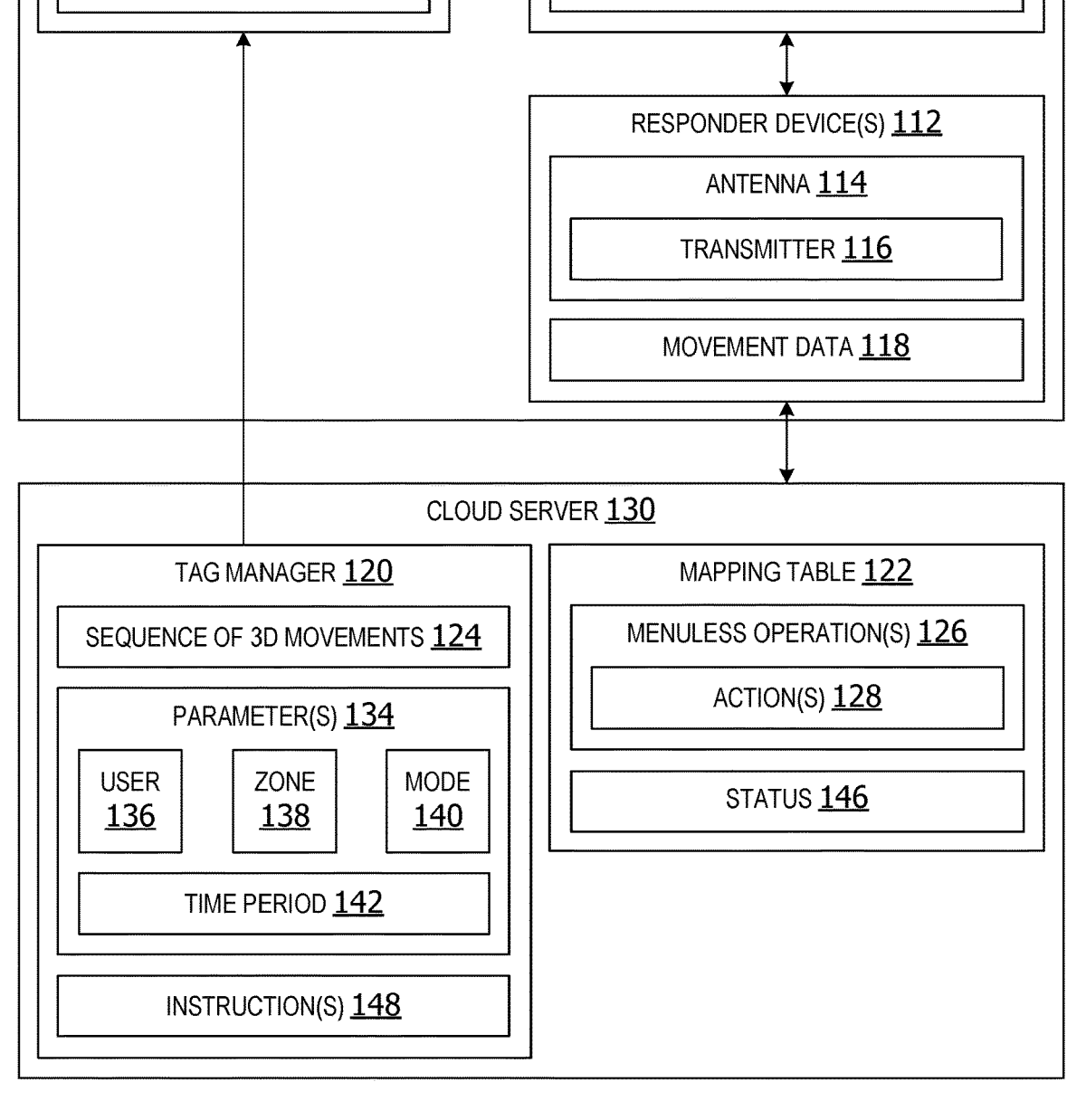
FIG. 1 is an exemplary block diagram illustrating a system for menuless operations using spatially aware tags with geo-fenced zones.

Aspects of the disclosure provide a computerized method and system for menuless operations using spatially aware tags with 3D virtual geo-fencing boundaries. In some examples, one or more responder devices generate movement data associated with one or more initiator devices within an area monitored by the responder device(s). The monitored area can include one or more zones having geo-fenced boundaries. A responder device is a device having a short-range communications antenna or transmitter, such as, but not limited to, an ultrawide band (UWB) enabled device. An initiator device is a device having a short-range communications antenna or transmitter, such as, but not limited to, a UWB enabled device. The initiator device may be referred to as a spatially aware tag. The initiator device can be implemented as, for example but not limited to, a badge, smart phone, wearable device, hand-held stylus, or any other UWB enabled device. This enables a user to use their identification badge, personal cellular phone, tablet, smart watch or any other UWB enabled device to be utilized as an initiator of menuless commands for improved user convenience, customization, and flexibility.

In other examples, a tag manager component receives movement data describing three-dimensional movements of the initiator device(s). The tag manager uses the movement data to identify a sequence of movements or series of movements of the initiator device. The movements can include any type of movement, such as moving up, down, left, right, circular movements, etc. The movement data includes data such as directionality, speed, height above the ground, angle, etc. The tag manager maps the sequence of movements to one or more action(s) to be performed by a target computing device. In other words, the sequence of movements is used as a code or instruction to identify an action or operation to be performed by the initiator device or another target computing device. The action can include turning a device on or off, changing an operational mode of the device, activating a camera, drawing a geo-fence boundary, removing a geo-fence boundary, modifying a geo-fence boundary, locking, or unlocking a door or window, as well as any other user-configurable action.

The tag manager, in other examples, transmits instructions to the target computing device triggering the device to perform the mapped action(s) or other operations without requiring the user to type in commands using a keyboard, mouse, touchscreen or other manual input device. Moreover, the user is able to perform menuless operations on a target computing device in a given geo-fenced zone without being physically present at the target computing device for improved user convenience and scalability.

Aspects of the disclosure further enable user-configurable menuless operations of a target computing device by creating a series of movements using an initiator device within range of one or more responder devices. This enables increased flexibility performing operations on a computing device without requiring the user to type commands or enter the commands verbally in an environment in which voice commands may be unwelcome, such as in a conference room, library, study area, or other quiet space. Likewise, enabling menuless operations using UWB enabled devices further enables entering commands in a non-verbal manner in loud environment in which voice-commands may not be practical, such as a stadium, concert, or other event.

The UWB enabled devices operate in an unconventional manner by providing user-configurable menuless operations commands for remote activation of computing device functionality in a zone-specific manner such that each user can engage different operations using different sequences of movements within different geo-fenced zones. In this manner, the system allows increased flexibility, scalability, as well as user-configurability of device functionality and menuless operations management, thereby improving functionality of the underlying computing device.

The use of initiator devices for entering menuless operations commands via the responders and tag manager further improves user efficiency via the user interaction using the spatially aware initiator devices rather than more traditional keyboards and touch screens for increased user interaction performance.

FIG. 1 is an exemplary block diagram illustrating a system 100 for menuless operations using spatially aware tags with geo-fenced zones. In some examples, the system 100 is located, stored and/or executed on one or more computing devices, such as a personal computer, server device, tablet computing device, or the like. For instance, a server device may be configured to create, monitor, and maintain a 3D virtual geo-fenced zone 102.

Alternatively, in other examples, the system 100 is distributed across multiple computing devices, such that components, elements, and/or parts of the system 100 may be located and/or executed on different computing devices that are in communication with each other (e.g., via one or more communication networks, such as internal networks, the Internet, or the like). For instance, the system 100 may be configured to store data associated with operations of the tag manager 120 on one or more distributed storage devices and/or the system 100 may be configured to execute the tag manager 120 on one or more distributed computing devices (e.g., the tag manager 120 is executed on a first server device and the mapping table 122 is executed on a second server device). In other examples, other arrangements of computing devices may be used to implement the system 100 without departing from the description.

The geo-fenced zone 102 is a virtual area having a geo-fence boundary defining a perimeter of the geo-fenced zone 102. In this example, the geo-fence zone boundary is user-configurable. The boundary can be any size and any shape, as an example, a 3D virtual object identifying a zone, in terms of X, Y, and Z coordinates, elevation and azimuth information in relation to a sound reference, enclosing a user-configurable area having length, width, and height above a surface, such as the ground or floor.

In some examples, the geo-fenced zone 102 can enclose an area that includes an indoor area, an outdoor area, partially outdoor area, partially indoor area, or an area that is a hybrid of both indoor and outdoor areas. For example, the geo-fenced zone 102 can include a conference room, a stadium, a library, an outdoor amphitheater, a cafeteria, a picnic area, an atrium, a gazebo, an office, or any other indoor or outdoor space.

The geo-fenced zone 102 can encompass an entire indoor space as well as encompass only a portion of an indoor space. For example, the geo-fenced zone 102 can encompass an entire conference room, half the conference rooms, a fourth of the conference room, or any other portion of the conference room. In one example, the geo-fenced zone 102 includes the area within one corner of the conference room.

As an additional option, zones can be cut and pasted to another area without further reprogramming by the user or other allowed programmers.

The geo-fenced zone 102 includes at least one initiator device 104 associated with at least one user 106. The initiator device 104 includes hardware, firmware, and/or software configured to transmit signals using short-range communications, such as, but not limited to, an ultrawide band (UWB) enabled device, a BLUETOOTH® device, a near field communications (NFC) device, or any other type of short-range communications device having an antenna 108 and/or a transmitter 110 for transmitting signals which are detectable by one or more responder device(s) 112. In this example, the initiator device 104 is a UWB enabled device having a UWB transmitter 110.

The initiator device 104 may also be referred to as a tag, an initiator, an initiator tag, or a spatially aware tag. The initiator device 104 can be implemented within another device or incorporated within another device. For example, the initiator device 104 can be implemented within a user device, a user identification badge, a stylus pen, a laser pointer pen, a laptop, tablet computing device, keychain, remote control device, joystick, a glove, a watch, a ring, or any other object capable of incorporating the UWB transmitter 110. A user device is a mobile computing device having a processor and a memory, such as, but not limited to, a smart phone, a smart watch, a tablet, etc. In some examples, the initiator device 104 is a hand-held device or a wearable device having a UWB transmitter 110 which is held by the user 106 or worn by the user as the user moves the device in a sequence or series of movements to generate the movement data 118.

The geo-fenced zone 102, in some examples, includes a plurality of responder device(s) 112. A responder device in the plurality of responder devices includes hardware, firmware, and/or software configured to send and receive short range communications via a short-range communications antenna 114 and/or transmitter 116 for receiving signals from the initiator device 104 and transmitting movements data 118 to a tag manager 120 component. The responder device(s) 112 working alone or in conjunction with one another obtain signals from the initiator device which are used to determine a location of the initiator device 104 over time. The responder device(s) 112 are located at stationary or semi-stationary locations within the geo-fenced zone 102.

The responder device(s) 112, in some examples, utilize the location signals obtained from the initiator device to generate movement data 118 describing the 3D movements of the initiator device 104 within the geo-fenced zone 102. In some examples, three or more responder device(s) 112 utilize the signals from the initiator device to triangulate the changing position, speed, angle, and directionality of the initiator device 104 as the initiator device is moved by the user 106.

The responder device(s) 112 can be implemented as any type of short-range communications devices, such as, but not limited to, a BLUETOOTH®, NFC, UWB or any other short-range communications devices. In this example, the responder device(s) 112 are UWB enabled devices having UWB antennas for receiving signals from the initiator device and transmitting movement data 118 to the tag manager 120. When the initiator device is in proximity of a responder device, the responder device can wirelessly start a communication. The responder device utilizes the UWB protocol to estimate the distance, angles, and directionality of the initiator device within a 3D space.

A responder device can be referred to as a beacon or a spatially aware tag. The responder device(s) track movement of the initiator device and/or locate the initiator device within the geo-fenced zone 102. In some examples, the responder device can be implemented as a computing device, a smart phone, a UWB tag, or any other UWB enabled device.

The tag manager 120 includes hardware, firmware, and/or software configured to perform menuless operations using movement data obtained from spatially aware initiator devices. The tag manager 120, in some examples, obtains the movement data 118 associated with the initiator device 104 within the selected geo-fenced zone 102 from one or more of the responder device(s) 112. The tag manager 120 identifies a sequence of 3D movements 124 of the initiator device 104 within the selected geo-fenced zone 102 using the movement data 118.

The sequence of 3D movements 124 is a pattern, series, or sequence of movements of the initiator device detected by the responder device(s). In some examples, the movements in a given sequence of movements occur within a predetermined period of time. For example, if the initiator device moves upward, then downward, then to the right and stops for ten seconds. Then the initiator device moves downward, the downward movement occurring ten seconds later may be disregarded or not included in the sequence of 3D movements due to the time lag or delay between the third movement (to the right) and the last movement downward. Thus, only the movements occurring within a given time-period or movements occurring within a predetermined time-period of the last detected movement are included in the sequence of 3D movements 124. In this example, the sequence of 3D movements 124 would be up-down-right. The final downward movement occurring after the 10 second delay may also be considered part of a new sequence of 3D movements occurring after the first sequence of up-down-right. The 3D movements can also be a combination of one or more initiator devices to one or more responders collectively acting as a listening server.

The tag manager 120 maps the sequence of 3D movements 124 to one or more menuless operation(s) 126 mapping to the identified sequence of 3D movements 124 in a mapping table 122. The mapping table 122 is any type of data table, database, or other mapping table enabling the tag manager 120 to map a sequence of movements to a user-configured action, such as, but not limited to, the one or more action(s) 128 defined by each menuless operation in the plurality of menuless operation(s) 126 in the mapping table 122.

The mapping table 122 is stored on a cloud server 130 with the tag manager 120. However, the examples are not limited to storing the mapping table 122 on the same cloud server with the tag manager 120. In other examples, the mapping table 122 is stored on a remote data storage device, a user device, a cloud storage, or any other data store accessible by the tag manager 120.

The cloud server 130 is a logical server providing services to one or more computing devices or other clients, such as, but not limited to, the responder device(s) 112 and/or the target computing device 132. The cloud server 130 is hosted and/or delivered via a network. In some non-limiting examples, the cloud server 130 is associated with one or more physical servers in one or more data centers. In other examples, the cloud server 130 is associated with a distributed network of servers.

The network is implemented by one or more physical network components, such as, but without limitation, routers, switches, network interface cards (NICs), and other network devices. The network is any type of network for enabling communications with remote computing devices, such as, but not limited to, a local area network (LAN), a subnet, a wide area network (WAN), a wireless (Wi-Fi) network, or any other type of network.

In some examples, the tag manager 120 identifies one or more parameter(s) 134 associated with the movement data 118 used during mapping of the sequence of 3D movements 124 to the menuless operation(s) 126. The parameter(s) 134 include one or more parameters such as, but not limited to, an identification of the user 136 paired with the initiator device 104, the zone 138 in a plurality of zones in which the initiator device 104 is located, current mode 140 of the initiator device and/or time-period 142 in which the movement data is generated. The user-configured actions and sequence of 3D movements mapping to each action are customizable based on the user generating the movement data or otherwise using the initiator device when the sequence of 3D movements occur.

For example, if user A performs a sequence of 3D movements that is a right-down-left movement, this can link to an action to turn a light on or off. However, user B can configure the menuless operations such that when user B performs the same right-down-left movement, this links to an action to change a mode of the initiator device to a write mode enabling the user to type text into a word document using the initiator device in the geo-fenced zone 102. In this manner, the set of menuless operations are user-specific and user-customizable. The tag manager identifies the user 106 and customizes the menuless operations responses to any user-specific sequence of movements or actions designated by the user 106 or for the user 106.

In other examples, the menuless operations are zone-specific such that a sequence of movements maps to different actions based on the zone in which the sequence of 3D movements occurs. For example, if the sequence of 3D movements 124 includes a long straight-line movement ending in a sudden downward motion is performed in a first zone, this can link to an instruction to draw a long straight geo-fence boundary along a wall in a room corresponding to the directionality of the initiator device. The downward motion, in this example, indicates an instruction to stop drawing the boundary line or end the boundary line. If the same sequence of straight line and downward motion is performed in a different second zone, the same sequence of 3D movements might link to a different action to turn on a row of IoT light devices. In this manner, each menuless operation is customizable for each different zone.

The mode 140 indicates a mode of operation. The menuless commands triggered by movements of the initiator device(s) may change depending on the current operational mode of the initiator device and/or the target computing device 132. The target computing device 132 is any type of computing device or IoT device 144 within the geo-fenced zone 102. The target computing device 132 includes at least a processor and a memory. The target computing device 132 further includes a network device that enables the target computing device 132 to receive instructions from the tag manager 120 on the cloud server 130. For example, if the target computing device 132 is in a camera or security monitoring mode, the menuless operations may include operations or actions associated with panning a camera, changing focus, zooming in, recording video, etc. In other examples, if the target computing device is in a light mode, the menuless operation(s) 126 which map to the movement data may include actions to increase lighting brightness, dim lights, turn lights on, turn lights off, etc. Thus, the menuless operations mapped to a sequence of movements may change depending on the operational mode/functionality of the target computing device, initiator device, and/or one or more IoT devices.

In other examples, the tag manager locks out a menuless operation or action based on the time-period 142 in which the sequence of 3D movements occurs. For example, a user may be able to perform a series of movements to trigger activation of an IoT device or devices during office hours, such as, a time-period from nine in the morning to five in the afternoon. Outside that time-period, the user may be locked out from accessing or controlling the IoT or other devices.

The tag manager triggers the target computing device 132 to perform the action mapped to the sequence of 3D movements 124 based on the user 136, zone 138, current mode 140 of the target computing device and/or time-period 142 in which the sequence of movements occur. In other examples, the tag manager updates a status 146 of the target computing device 132 and/or initiator device to reflect a current mode or change in mode of the device(s).

The tag manager, in some examples, triggers the initiator device and/or the target computing device 132 to perform the action(s) mapped to the sequence of 3D movements by generating instructions. The instructions 148 are transmitted to the target computing device via the network. The instructions 148 cause the target computing device to perform the one or more action(s) 128.

In the example of FIG. 1, the target computing device is a separate computing device within the geo-fenced zone 102. In other examples, the target computing device can include a user device or other computing device which is serving as the initiator device. In other examples, the target computing device can include the cloud server or other computing device hosting the tag manager 120. Thus, the action(s) performed on the target computing device in response to the sequence of 3D movements can include action(s) which cause the cloud server 130 to perform an action/operation, as well as action(s) which cause the initiator device to perform an action/operation.

In this example, the target computing device 132 includes an IoT device 144. In other examples, the IoT device is a stand-alone device which is not implemented within a computing device, such as, but not limited to, a stand-alone lighting device, smart refrigerator, sound system, television, smart thermostat, etc. Likewise, the target computing device 132 can optionally also include a computing device which is placed into a functionality mode which mimics an IoT device. For example, the target computing device can behave as a smart thermostat, a security system/camera monitoring system, etc.

In another example, the user can initiate a pre-programmed set of movements that include time signatures in between each movement where a collection of all movements in a time sequence indicates an action. Passwords and second factor authentication can be enabled in this form and optionally, in a combination with other authentication factors like a fingerprint, other personal sensors, to further identify the user and allow them to communicate their 3D movement to the server. Time sequences can vary in duration as the 3D movements are correlated at the server.

In another example, a camera or equivalent imaging artificial intelligence (AI) or other forms of a scanner like a radar can be further used to identify the person or objects constructing the 3D movements as an assurance of an actual presence.

Figure 2:
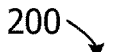
FIG. 2 is an exemplary block diagram illustrating a system for menuless operations using spatially aware initiator device(s) within a plurality of zones.
Figure 2:
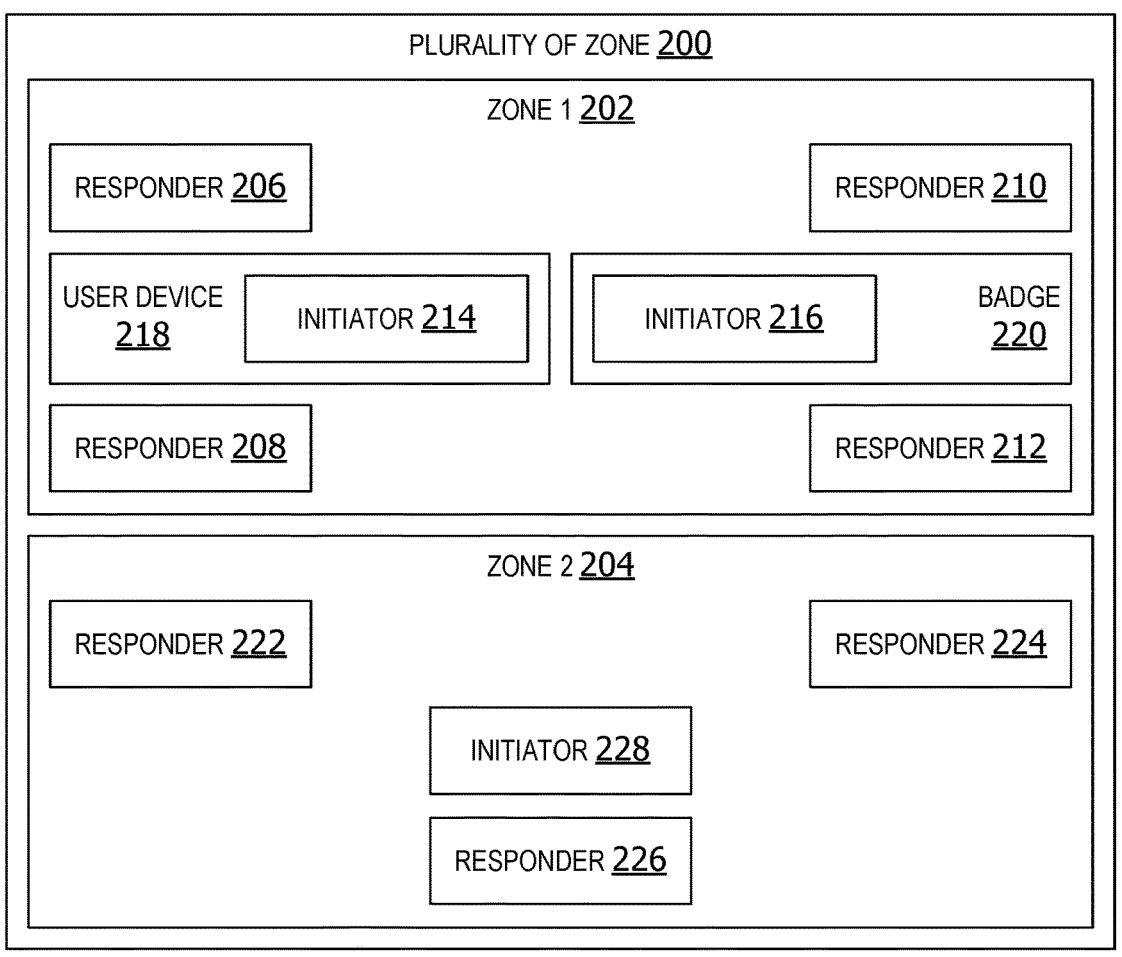

FIG. 2 is an exemplary block diagram illustrating a system for menuless operations using spatially aware initiator device(s) within a plurality of zones 200. In this example, the plurality of zones 200 includes a first zone 202 and a second zone 204. However, the examples are not limited to two zones. In other examples, the plurality of zones 200 includes three or more zones.

The first zone 202 includes a set of four responder devices, a responder 206, a responder 208, a responder 210, and a responder 212. The responder 206, responder 208, responder 210 and responder 212 are responder devices configured for short-range communications, such as, but not limited to, the responder device(s) 112 in FIG. 1.

In this example, each responder is located in a corner of a rectangular shaped geo-fenced area. However, the examples are not limited to placement of responder devices at corners of a rectangular-shaped zone. In other examples, the responder devices may be located at any location within the zone.

Each responder is optionally located at a fixed location or a stationary location. However, in other examples, the responder devices are removably fixed to a stationary location and can be removed and relocated to a new location. The responder devices may be located anywhere within the zone. For example, a responder device may be mounted to a wall, ceiling, a post, a beam, a fixture, a piece of furniture, or any other location within the zone.

In this example, the first zone 202 includes two initiator devices, an initiator device 214 and an initiator device 216. However, the examples are not limited to two initiator devices within a single zone. In other examples, the zone may include a single initiator device, as well as three or more initiator devices.

The initiator device 214 in this example is implemented within a user device 218. The user device 218 represents any device executing computer-executable instructions. The user device 218 can be implemented as a mobile computing device, such as, but not limited to, a wearable computing device, a mobile telephone, laptop, tablet, computing pad, netbook, gaming device, and/or any other portable device. The user device 218 includes at least one processor and a memory. The user device 218 can also include a user interface component. In this example, the user device 218 includes a UWB antenna which enables the user device 218 to function as an initiator device 214.

The initiator 216 is an initiator device incorporated within a badge 220. The badge 220 in this example is a badge worn by a user. In some examples, the user device 218 and the badge 220 are linked to the same user. In these examples, movement data generated for the first initiator device 214 and the second initiator device 216 can be used together to trigger menuless operations by the tag monitor. In other examples, the initiator device 214 is associated with a first user and the initiator device 216 is associated with a different second user.

The second zone 204, in this example, includes three responder devices, a responder 222, a responder 224 and/or a responder 226. The responders are placed in at three points within the zone 204. This enables the responders to triangulate signals generated by the initiator 228 for locating the initiator with precision. However, the examples are not limited to three responder devices. In other examples, the zone 204 can include a single responder device, two responder devices, as well as four or more responder devices.

In some examples, the user creates gestures or a sequence of movements by moving the initiator device (UWB tag). The gestures are identified based on the 3D orientation of the initiator device. As the initiator device moves through 3D space, the system determines directionality of the initiator device relative to the responder device(s), direction, speed of movement, angle of movement, etc. The UWB tags enable precision and accuracy in the identification of the movements of the initiator tag.

Figure 3:
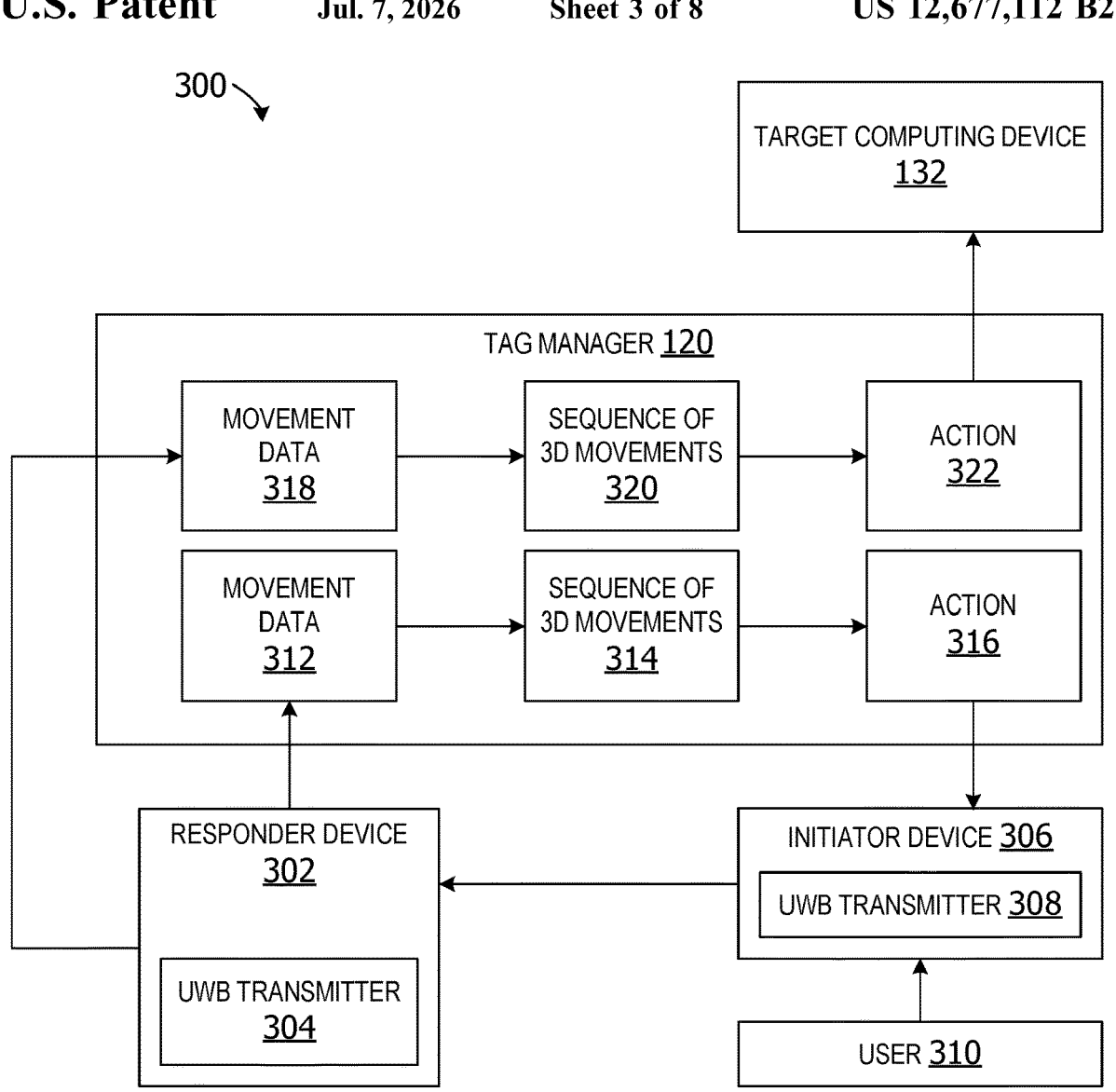
FIG. 3 is an exemplary block diagram illustrating a tag manager using initiator device movement data to trigger menuless operations in one or more target devices.

FIG. 3 is an exemplary block diagram illustrating a system 300 including a tag manager 120 using initiator device movement data to trigger menuless operations in one or more target devices. In this example, a responder device 302 having a UWB transmitter 304 receives UWB signals from an initiator device 306 having a UWB transmitter 308. The initiator device 306 is associated with a user 310. As the user moves the initiator device 306 in a first series of 3D motions, the responder device 302 generates movement data 312 describing the 3D movements. The tag manager 120 analyzes the movement data 312 to identify a sequence of 3D movements 314 which is mapped to an action 316. In this example, the action 316 changes a mode of the initiator device 306 from a current mode to a new mode.

For example, if the sequence of 3D movements 314 maps to a geo-fence drawing mode, the tag manager 120 generates instructions which cause the tag manager 120 to update the status of the initiator device 306 from a current mode to the geo-fence drawing mode. The tag manager 120 may also send instruction to the initiator device which indicates the mode change. If the initiator device is implemented in a user device, a notification may be displayed to the user via a user interface device on the user device alerting the user that the initiator device is now in a geo-fence drawing mode in which the user can create, modify, or remove virtual geo-fence boundaries.

If the user then moves the initiator device 306 in a new series of movements, the responder device 302 generates new movement data 318. The new movement data 318 is analyzed by the tag manager 120. The tag manager 120 identifies a new sequence of 3D movements 320. The tag manager 120 maps the new sequence of 3D movements 320 to an action 322. In some examples, the tag manager 120 performs the mapping using a mapping table containing the user-configurable menuless operations mapped to various sequences of movements. The tag manager 120 generates instructions which trigger performance of the action 322 on the target computing device 132.

In other examples, when a particular zone is enabled, a target computing device within the zone can be reconfigured to behave in accordance with a predefined functionality. In other words, the computing device can become specialized to perform specific sets of functions within a specific zone by virtue of the presence of the target computing device within the zone. In an example scenario, whenever a computing device is present within a given zone, the tag manager configures the computing device to function as a ring camera. In this example, the target computing device acts as the initiator device. The presence of the computing device servers as the set of movements of the initiator device which are interpreted as a menuless command to initiate the predefined functions (operate as a ring camera) within that zone. In a different zone, the same computing device may operate with different functionality.

FIG. 4 is an exemplary block diagram illustrating a mapping table 122 used to map a series of initiator device movements to one or more user-configurable operations. In this example, each sequence of 3D movements 402 is linked to one or more action(s) 404. For example, a sequence including an up movement, down movement followed by a left movement is linked to an action to switch a target device from current mode into a geo-fence modification mode enabling the user to modify or remove portions of an existing geo-fence. In another example, a sequence of movements including a down movement, left movement and then a right movement is linked to a command to turn on an IoT device. In another example, a sequence includes moving the initiator device in a circle and then downward indicates a user's desire to switch from the current mode to a write mode in which the user can write text into a word document using the initiator device.

In the examples of FIG. 4, the sequences of 3D movements all include a sequence of two or three 3D movements. However, the examples are not limited to two or three movements. In other examples, a sequence of movements can include four or more 3D movements made by a user using an initiator device. In an example, a sequence of 3D movements can include the initiator moving left-left-right and then flipping forty-five degrees.

In other examples, the sequence of 3D movements can include a single movement, such as, but not limited to, a change in height or distance from the ground or other surface. For example, if a user holding, wearing, or carrying the initiator device gets closer to the ground, the system generates an alert. The alert could be sent to a caregiver or an emergency services provider indicating that the user may have fallen.

Figure 5:
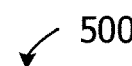
FIG. 5 is a flowchart illustrating a computerized method for generating movement data according to an embodiment.
Figure 5:
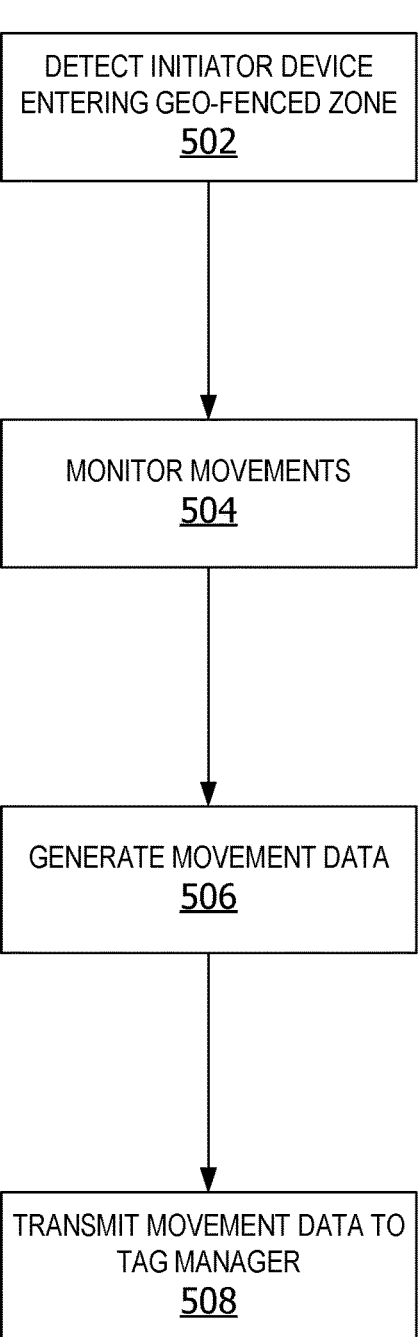

FIG. 5 is a flowchart illustrating a computerized method 500 for generating movement data according to an embodiment. In some examples, the method 500 is performed on a system such as system 100 of FIG. 1 and/or the system 300 of FIG. 3 as described herein. At 502, a responder device detects an initiator device entering a geo-fenced zone. The geo-fenced zone is a 3D virtual geo-fenced area encompassing one or more responder devices and one or more initiator devices, such as, but not limited to, the geo-fenced zone 102 in FIG. 1, the zone 202 in FIG. 2, and/or the zone 204 in FIG. 2. In other examples, the responder device(s) may be located outside a geo-fenced zone, such as where a user is creating or modifying a geo-fenced zone.

The responder device(s) monitor the initiator device(s) movements at 504. The responder device(s) monitor the movements, in some examples, by triangulating signals received from the initiator device(s). The responder device(s) generates movement data at 506. The movement data is data describing the movement(s) of the initiator device(s) detected by the responder device(s). The responder device(s) transmit the movement data to the tag manager at 508. The tag manager, in this example, is a software component for identifying a predefined sequence of 3D movements and mapping the sequence to a user-configured menuless operation.

Figure 6:
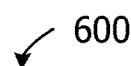
FIG. 6 is a flowchart illustrating a computerized method for menuless operations using spatially aware tags with geo-fenced zones according to an embodiment.
Figure 6:
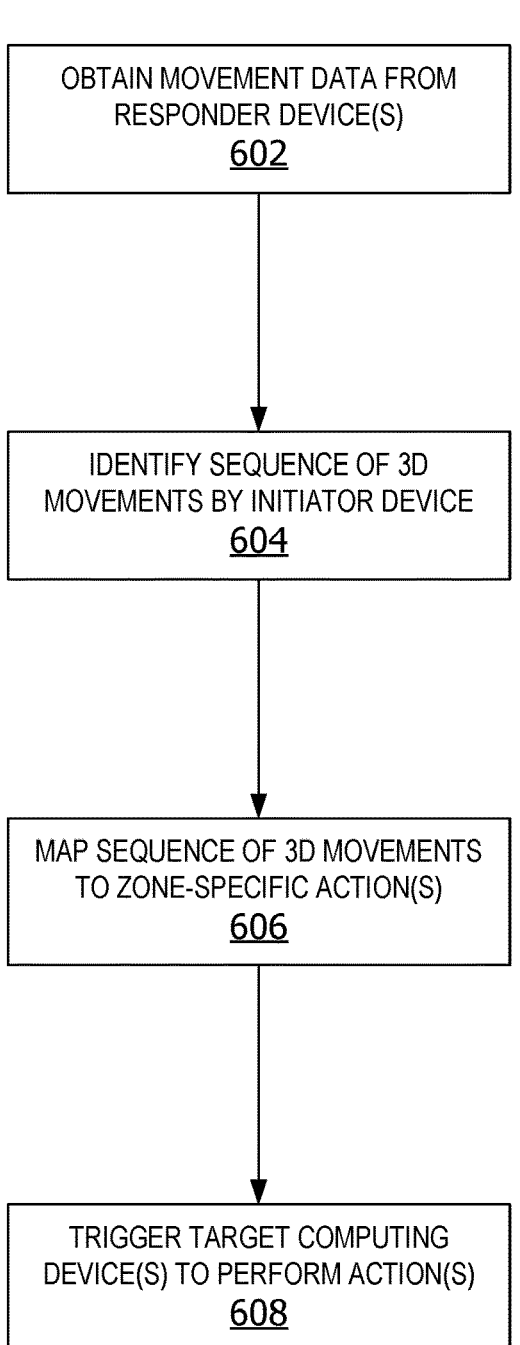

FIG. 6 is a flowchart illustrating a computerized method 600 for menuless operations using spatially aware tags with geo-fenced zones according to an embodiment. In some examples, the method 600 is performed on a system such as system 100 of FIG. 1 and/or the system 300 of FIG. 3 as described herein. A tag manager obtains movement data from one or more responder device(s) at 602. The responder device(s) in this example include UWB enabled devices, such as, but not limited to, the responder device(s) 112 in FIG. 1. The tag manager identifies a sequence of 3D movements performed by the initiator device at 604. The sequence of 3D movements is identified using the movement data. The movement data is data describing the direction, speed, angle, and directionality of the initiator device movements as detected by the responder device(s), such as, but not limited to, the movement data 118 in FIG. 1. The tag manager maps the sequence of 3D movements to zone-specific action(s) at 606. The mapping can occur using a mapping table, such as, but not limited to, the mapping table 122 in FIG. 1 and FIG. 4. The tag manager triggers a target computing device to perform the action(s) at 608. In some examples, the target computing device is a separate computing device or IoT device located within the geo-fence zone. In other examples, the initiator device and/or the cloud server hosting the tag manager can be the target computing device.

Figure 7:
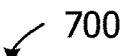
FIG. 7 is a flowchart illustrating a computerized method for zone-specific mapping of initiator device movements to user-configured menuless operations according to an embodiment.
Figure 7:
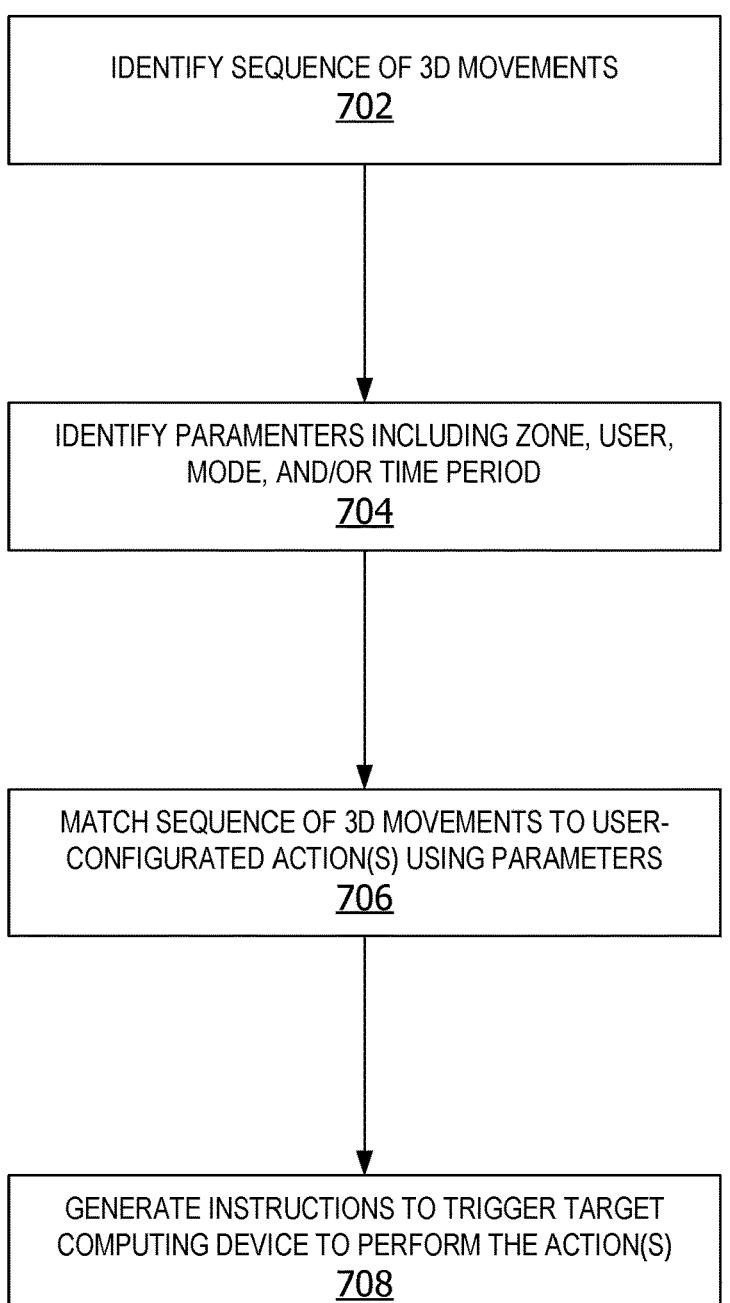

FIG. 7 is a flowchart illustrating a computerized method 700 for zone-specific mapping of initiator device movements to user-configured menuless operations according to an embodiment. In some examples, the method 700 is performed on a system such as system 100 of FIG. 1 and/or the system 300 of FIG. 3 as described herein.

At 702 the tag monitor identifies a sequence of 3D movements using the movement data received from one or more responder devices. The tag monitor identifies parameters, such as, but not limited to, the zone, user, mode and/or time-period in which the sequence of movements was detected at 704. The tag manager matches the sequence of movements to the user-configured action(s) using the parameters at 706. The parameters specify which actions should be triggered based on which zone the initiator device was located in, which user was paired with the initiator device, when the movement data was generated and the operational mode of the initiator device. For example, an initiator device in a write mode performing a given sequence of movements might result in a different action than the same initiator mode performing the same given sequence of movements in a drawing mode. The tag manager generates instructions to trigger the target computing device to perform the action(s) matching the sequence of 3D movements at 708.

Exemplary Operating Environment

Figure 8:
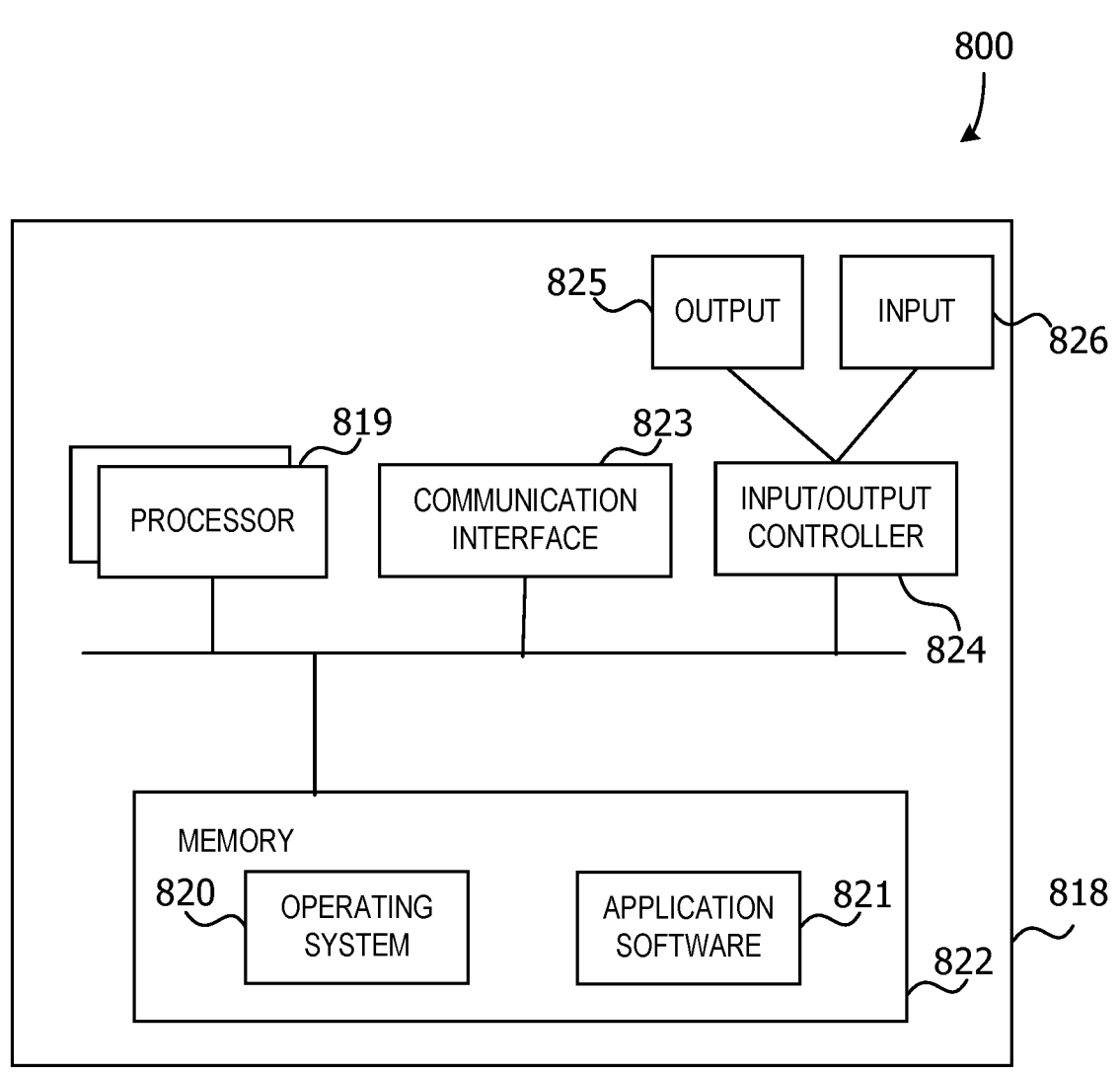
FIG. 8 illustrates a computing apparatus according to an embodiment as a functional block diagram.

The present disclosure is operable with a computing apparatus according to an embodiment as a functional block diagram 800 in FIG. 8. In an embodiment, components of a computing apparatus 818 may be implemented as a part of an electronic device according to one or more embodiments described in this specification. The computing apparatus 818 comprises one or more processors 819 which may be microprocessors, controllers, or any other suitable type of processors for processing computer executable instructions to control the operation of the electronic device. Alternatively, or in addition, the processor 819 is any technology capable of executing logic or instructions, such as a hardcoded machine. Platform software comprising an operating system 820 or any other suitable platform software may be provided on the apparatus 818 to enable application software 821 to be executed on the device. According to an embodiment, training and using a summarization model to provide topic labels for communication transcripts as described herein may be accomplished by software, hardware, and/or firmware.

Computer executable instructions may be provided using any computer-readable media that are accessible by the computing apparatus 818. Computer-readable media may include, for example, computer storage media such as a memory 822 and communications media. Computer storage media, such as a memory 822, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus.

In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 822) is shown within the computing apparatus 818, it will be appreciated by a person skilled in the art, that the storage may be distributed or located remotely and accessed via a network or other communication link (e.g., using a communication interface 823).

The computing apparatus 818 may comprise an input/output controller 824 configured to output information to one or more output devices 825, for example a display or a speaker, which may be separate from or integral to the electronic device. The input/output controller 824 may also be configured to receive and process an input from one or more input devices 826, for example, a keyboard, a microphone, or a touchpad. In one embodiment, the output device 825 may also act as the input device. An example of such a device may be a touch sensitive display. The input/output controller 824 may also output data to devices other than the output device, e.g., a locally connected printing device. In some embodiments, a user may provide input to the input device(s) 826 and/or receive output from the output device(s) 825.

The functionality described herein can be performed, at least in part, by one or more hardware logic components. According to an embodiment, the computing apparatus 818 is configured by the program code when executed by the processor 819 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for menuless operations using spatially aware tags comprises: at least one processor; and at least one memory comprising computer program code, the at least one memory and the computer program code configured to, with the at least one processor, cause the at least one processor to: obtain, from a plurality of responder devices, movement data associated with an initiator device within a selected geo-fenced zone, the movement data comprising data describing a sequence of three-dimensional (3D) movements of the initiator device within the selected zone, the initiator device comprising an ultrawide band (UWB) transmitter; map, by a tag manager implemented on the processor, the sequence of 3D movements of the initiator device to a zone-specific action; trigger, by the tag manager, a target computing device to perform the zone-specific action mapped to the sequence of 3D movements.

An example computerized method for menuless operations using spatially aware tags comprises: obtaining movement data associated with an initiator device within a selected geo-fenced zone from a responder device; identifying a sequence of three-dimensional (3D) movements of the initiator device within the selected geo-fenced zone using the movement data; map, by a tag manager implemented on a processor, the sequence of 3D movements of the initiator device to a zone-specific action; and trigger, by the tag manager, a target computing device within the selected geo-fenced zone to perform the zone-specific action mapped to the sequence of 3D movements.

One or more computer storage media having computer-executable instructions for menuless operations using spatially aware tags that, upon execution by a processor, cause the processor to at least: obtain, from a plurality of responder devices, movement data associated with an initiator device within a selected geo-fenced zone, the movement data describing a series of movements of the initiator device within a three-dimensional (3D) area; identify a sequence of 3D movements of the initiator device within the selected zone using the movement data, the initiator device comprising a UWB antenna, where each responder in the plurality of responders comprises a UWB antenna; map, by a tag manager implemented on the processor, the sequence of 3D movements of the initiator device to a zone-specific action; and transmit an instruction to a target computing device within the selected geo-fenced zone, wherein the instruction causes the target computing device to perform the zone-specific action mapped to the sequence of 3D movements.

In some examples, the system provides for setting 3D virtual geo-fencing boundaries using spatially aware tags. The spatially aware tags are devices enabling wireless technology, such as UWB, used for secure arranging between devices. In some examples, the system enables a user to move a UWB enabled tag (initiator device) in free space to draw the geo-fence boundaries of one or more zones. Instead of going to a program on a computing device to create the boundaries, the system enables the user to move the tag (initiator device) around in 3D space to draw the zone boundaries. In this manner, the system automatically creates the geo-fenced zones using the predefined sequence of 3D movements and the mapping table to create the 3D virtual geo-fenced boundaries for the user. The system can also be used to remove boundaries or modify the shape or location of the boundaries using the initiator device(s) for drawing in 3D space because of the accuracy of the distance and angle determination enabled by the UWB tags. This enables users to create boundaries for zones using UWB gestures.

In other examples, a system is provided for menuless operations using spatially aware tags with virtual geo-fenced boundaries. A tag manager implemented on a processor, among other functions, is enabled to program or delete newly drawn geo-fenced zones by obtaining movement data associated with a UWB enabled initiator device within any tracked zone from one or more UWB enabled responder devices. The tag manager identifies a sequence of three-dimensional (3D) movements of the initiator device within a not yet formed or a previously programmed geo-fenced zone using the movement data. The tag manager maps the sequence of 3D movements of the initiator device to a zone-specific predefined action using a mapping table. The tag manager triggers a target computing device within the selected geo-fenced zone to perform the mapped action(s). The target computing device can include a user device within the geo-fenced zone, an internet of things (IoT) device and/or the initiator device itself.

When a user holds the initiator device (tag) and walks or makes gestures with the initiator device, the system identifies the movements using the angle, distance, and direction of movement of the initiator device. Directionality permits the system to determine which direction a "face" of the initiator device is facing. Instead of requiring the user to go to a computing device, keyboard, or other input device to enter commands associated with creating a geo-fence boundary or other operation, the system interprets the series of gestures (sequence of movements) of the initiator device, as menuless commands. Each sequence of movements is interpreted as a command or instructions to perform an action by the computing system with precision and accuracy.

In an example scenario, the user moves the initiator device in a series of gestures which put the initiator device into a write mode. In the write mode, the user moves the initiator device through other series of gestures (sequence of movements) to write on a screen in a writing application using the initiator device instead of a keyboard. In other examples, different sequences of movements can be used to paint/draw, run a slide show, use a camera, browse online content, etc.

In some examples, when the initiator device is moved in a predefined pattern/sequence of movements, the pattern is detected by the responders which sends the information to the tag manager on a server. The tag manager performs a preprogrammed action matched to the pattern/sequence of movement.

In other examples, a target computing device gets activated to perform various zone-specific functions. In these examples, when the target computing device is detected within a zone by the responder device(s), the target computing device is treated as an initiator device. The presence of the target computing device within the zone creates the movement data. In other examples, an initiator device is placed on or near the target computing device. The detection of the initiator device on or near the target computing device generates movement data which is interpreted by the tag manager as a menuless command to initiator the zone-specific functions/action(s) in the target computing device.

In an example scenario, the presence of a target computing device in a given zone is a sequence of movements by an initiator device which triggers activation of the target computing device to perform zone-specific functions. The zone-specific functions can include acting as a thermostat for a heat, functioning as a ring camera, playing music, etc. The target computing device performs different functions when moved into a different zone. In this manner, the computing device is automatically provisioned based on presence of the computing device within a zone.

Other examples provide a spatial intelligent network that manages geo-fenced zones and their associated activities by providing a new and convenient way to draw the 3D zones in a physical space using a spatially aware tag/responder network. Using technologies like UWB for proximity awareness and secure ranging between an initiator and a responder, detection precision is higher and more accurate than with other BLUETOOTH® or NFC. UWB technology accomplishes a ranging estimation less than 10 centimeters (cm) in distance and 10 degrees in 3D space. That precision accuracy makes it possible to implement and deploy in spatial intelligent networks like conference rooms, homes, airports, commercial settings, etc. Any space can be virtually assigned zones where users define seamless activities that are launched as soon as a user is detected in a pre-programmed zone. This brings about a 3D-marking of a zone geometry by using a UWB (or equivalent ranging technology) and drawing the 3D boundaries of the zone by moving a tag (initiator device) around the area of the desired zone.

As an example, a user can hold the tag and 3D draw the zone in which certain activities can be later on assigned for that zone. This approach brings about the flexibility and speed needed to dynamically change or re-draw geo-fenced zones by walking or drawing with a UWB tag, A tag manager on a server registers the new zones and actively monitors users moving in and out of such zones.

In another example, a user can draw a virtual fence on the fly and be alerted if someone encroaches on the zone limits. In another scenario, a user can program or set zones within internal building spaces to protect equipment from leaving the zone or for allowing provisioned personnel seamless access to equipment as they enter a zone. An authorized user may be allowed to utilize Wi-Fi in one zone but not allowed to utilize it in another zone for improved customization and configurability.

Alternatively, or in addition to the other examples described herein, examples include any combination of the following:

change an operational mode of the initiation device from a current mode to a geo-fence drawing mode in response to the sequence of 3D movements mapping to an action corresponding to placing the initiation device in a geo-fence drawing mode;

receive new movement data associated with movements of the initiation device in the geo-fence drawing mode from the plurality of responder devices;

creating virtual geo-fence boundaries using the new movement data from the initiation device in the geo-fence drawing mode;

place the target computing device into a user-configured operational mode, wherein the target computing device performs a plurality of actions associated with the user-configured operational mode within the selected geo-fenced zone;

identify a first user paired to a first initiator device within the first zone and a second user paired to a second initiator device within a second zone in the plurality of zones;

map first movement data associated with the first initiator device to a first action associated with a first set of user-configurable actions linked to the first user;

map second movement data associated with the second initiator device to a second action associated with a second set of user-configurable actions linked to the second user, wherein a given sequence of movements is mapped to an action based on the user paired to the initiator device and the zone in which the initiator device is located;

detect a first initiator device entering the selected geo-fenced zone;

monitor 3D movements of the first initiator device by a responder device within the selected geo-fenced zone;

generate the movement data describing the monitored 3D movements of the first initiator device, the movement data comprising distance data, angle data and directionality data;

transmit the movement data to a cloud server;

causing an instruction to be sent to an internet of things (IoT) device within the selected geo-fenced zone in response to the sequence of 3D movements, wherein the instruction causes the IoT device to perform an action;

change a functionality of the target device from a first operational mode to a second operational mode in response to the set of 3D movements of the initiator device, wherein the target device is configured to perform a set of actions associated with the second operational mode in response to the change in functionality;

obtaining second movement data associated with a second initiator device within a second geo-fenced zone, the second movement data comprising data describing the sequence of 3D movements by the second initiator device within the second zone;

mapping, by the tag manager, the sequence of 3D movements of the second initiator device to a second action in a menuless operations mapping table;

trigger the second action in a second target computing device, wherein the second action is a different action than the first action, wherein a same sequence of 3D movements performed in a different zone is mapped to a different zone-specific action;

obtaining second movement data associated with the initiator device from the responder, the second movement data comprising data describing a second sequence of 3D movements of the initiator device;

mapping the second sequence of 3D movements to a second action in the menuless operations mapping table;

instructing the target computing device to perform the second action, wherein the second action is a different action than the first action;

permitting the zone-specific action to occur on the target computing device in response to the sequence of 3D movements occurring within a predetermined time-period;

preventing the zone-specific action from occurring in response to the sequence of 3D movements outside the predetermined time-period;

placing the initiator device into a geo-fence boundary modification mode in response to the sequence of 3D movements mapping to an action which changes the mode of the initiator device from a current mode to a geo-fence boundary modification mode;

wherein a user can create a new geo-fence boundary for a selected zone, modify a pre-existing geo-fence boundary for the selected zone, or remove a portion of the pre-existing geo-fence boundary for the selected zone.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining movement data associated with an initiator device within a selected geo-fenced zone from a responder device; exemplary means for identifying a sequence of three-dimensional (3D) movements of the initiator device within the selected geo-fenced zone using the movement data; exemplary means for mapping, by a tag manager implemented on a processor, the sequence of 3D movements of the initiator device to a zone-specific action; and exemplary means for triggering a target computing device within the selected geo-fenced zone to perform the zone-specific action mapped to the sequence of 3D movements.

The term "comprising" is used in this specification to mean including the feature(s) or act(s) followed thereafter, without excluding the presence of one or more additional features or acts. The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "cellular" as used herein refers, in some examples, to a wireless communication system using short-range radio stations that, when joined together, enable the transmission of data over a wide geographic area. The term "NFC" as used herein refers, in some examples, to a short-range high frequency wireless communication technology for the exchange of data over short distances.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a computer-readable medium storing instructions that are operative upon execution by the processor to:

obtain, from a plurality of responder devices, movement data associated with an initiator device within a selected geo-fenced zone, the movement data comprising data describing a sequence of three-dimensional (3D) movements of the initiator device within the selected geo-fenced zone, the initiator device comprising an ultrawide band (UWB) transmitter, the sequence of 3D movements occurring within a specified period of time;

map, by a tag manager implemented on the processor, the sequence of 3D movements of the initiator device to a zone-specific action; and trigger, by the tag manager, a target computing device to perform the zone-specific action mapped to the sequence of 3D movements.

2. The system of claim 1, and wherein the instructions are further operative to:

change an operational mode of the initiator device from a current mode to a geo-fence drawing mode in response to the sequence of 3D movements mapping to an action corresponding to placing the initiator device in the geo-fence drawing mode;

receive new movement data associated with movements of the initiator device in the geo-fence drawing mode from the plurality of responder devices; and creating virtual geo-fence boundaries using the new movement data from the initiator device in the geo-fence drawing mode.

3. The system of claim 1, wherein the instructions are further operative to:

place the target computing device into a user-configured operational mode, wherein the target computing device performs a plurality of actions associated with the user-configured operational mode within the selected geo-fenced zone.

4. The system of claim 1, wherein the instructions are further operative to:

identify a first user paired to a first initiator device within a first zone and a second user paired to a second initiator device within a second zone in a plurality of zones;

map first movement data associated with the first initiator device to a first action associated with a first set of user-configurable actions linked to the first user; and map second movement data associated with the second initiator device to a second action associated with a second set of user-configurable actions linked to the second user.

5. The system of claim 1, wherein the instructions are further operative to:

detect the initiator device entering the selected geo-fenced zone;

monitor 3D movements of the initiator device by a responder device within the selected geo-fenced zone;

generate the movement data describing the monitored 3D movements of the initiator device, the movement data comprising distance data, angle data and directionality data; and transmit the movement data to a cloud server.

6. The system of claim 1, wherein the instructions are further operative to:

causing an instruction to be sent to an internet of things (IoT) device within the selected geo-fenced zone in response to the sequence of 3D movements, wherein the instruction causes the IoT device to perform an action.

7. The system of claim 1, wherein the instructions are further operative to:

change a functionality of the target computing device from a first operational mode to a second operational mode in response to the sequence of 3D movements of the initiator device, wherein the target computing device is configured to perform a set of actions associated with the second operational mode in response to the change in the functionality.

8. A method for menuless operations using spatially aware tags, the method comprising:

obtaining movement data associated with an initiator device within a selected geo-fenced zone from a responder device;

identifying a sequence of three-dimensional (3D) movements of the initiator device within the selected geo-fenced zone using the movement data, the sequence of 3D movements occurring within a specified period of time;

mapping, by a tag manager implemented on a processor, the sequence of 3D movements of the initiator device to a zone-specific action; and triggering, by the tag manager, a target computing device within the selected geo-fenced zone to perform the zone-specific action mapped to the sequence of 3D movements.

9. The method of claim 8, wherein the zone-specific action is a first action, and further comprising:

obtaining second movement data associated with a second initiator device within a second geo-fenced zone, the second movement data comprising data describing a sequence of 3D movements by the second initiator device within the second geo-fenced zone;

mapping, by the tag manager, the sequence of 3D movements of the second initiator device to a second action in a menuless operations mapping table; and triggering the second action in a second target computing device, wherein the second action is a different action than the first action, wherein a same sequence of 3D movements performed in a different zone is mapped to a different zone-specific action.

10. The method of claim 8, wherein the zone-specific action is a first action, and further comprising:

obtaining second movement data associated with the initiator device from the responder device, the second movement data comprising data describing a second sequence of 3D movements of the initiator device;

mapping the second sequence of 3D movements to a second action in a menuless operations mapping table; and instructing the target computing device to perform the second action, wherein the second action is a different action than the first action.

11. The method of claim 8, further comprising:

identifying a first user paired to a first initiator device within a first zone and a second user paired to a second initiator device within a second zone in a plurality of zones;

mapping first movement data associated with the first initiator device to a first action associated with a first set of user-configurable actions linked to the first user; and mapping second movement data associated with the second initiator device to a second action associated with a second set of user-configurable actions linked to the second user.

12. The method of claim 8, further comprising:

permitting the zone-specific action to occur on the target computing device in response to the sequence of 3D movements occurring within a predetermined time-period; and preventing the zone-specific action from occurring in response to the sequence of 3D movements outside the predetermined time-period.

13. The method of claim 8, further comprising:

placing the initiator device into a geo-fence boundary modification mode in response to the sequence of 3D movements mapping to an action which changes the mode of the initiator device from a current mode to the geo-fence boundary modification mode, modifies a pre-existing geo-fence boundary for a selected zone, or removes a portion of the pre-existing geo-fence boundary for the selected zone.

14. The method of claim 8, further comprising:

changing a functionality of the target computing device from a first operational mode to a second operational mode in response to the sequence of 3D movements of the initiator device, wherein the target computing device is configured to perform a set of actions associated with the second operational mode in response to the change in the functionality.

15. One or more computer storage devices having computer-executable instructions stored thereon, which, upon execution by a computer, cause the computer to perform operations comprising:

obtaining, from a plurality of responder devices, movement data associated with an initiator device within a selected geo-fenced zone, the movement data describing a sequence of 3D movements of the initiator device within the selected geo-fenced zone, the sequence of 3D movements occurring within a specified period of time;

identifying, by a tag manager implemented on a processor, the sequence of 3D movements of the initiator device within the selected geo-fenced zone using the movement data, the initiator device comprising an ultrawide band (UWB) antenna, where each responder in the plurality of responders comprises a UWB antenna;

mapping, by the tag manager, the sequence of 3D movements of the initiator device to a zone-specific action; and transmitting an instruction to a target computing device within the selected geo-fenced zone, wherein the instruction causes the target computing device to perform the zone-specific action mapped to the sequence of 3D movements.

16. The one or more computer storage devices of claim 15, wherein the operations further comprise:

obtaining second movement data associated with the initiator device within the selected geo-fenced zone from the plurality of responders, the second movement data comprising data describing a second sequence of 3D movements of the initiator device within the selected geo-fenced zone;

mapping the second sequence of 3D movements of the initiator device to a second action; and transmitting an instruction to the target computing device, the instruction causing the target computing device to perform the second action mapped to the second sequence of 3D movements, wherein the second action is a different action than the zone-specific action.

17. The one or more computer storage devices of claim 15, wherein the operations further comprise:

obtaining second movement data associated with a second initiator device within a second zone in a plurality of zones, the second movement data comprising data describing a sequence of 3D movements by the second initiator device within the second zone;

mapping, by the tag manager, the sequence of 3D movements of the second initiator device to a second action associated with a second set of zone-specific actions corresponding to the second zone; and triggering the second action in the target computing device, wherein the second action is a different action than the zone-specific action.

18. The one or more computer storage devices of claim 15, wherein the operations further comprise:

identifying a first user paired to a first initiator device within a first zone and a second user paired to a second initiator device within a second zone in a plurality of zones;

mapping first movement data associated with the first initiator device to a first action associated with a first set of user-configurable actions linked to the first user; and mapping second movement data associated with the second initiator device to a second action associated with a second set of user-configurable actions linked to the second user.

19. The one or more computer storage devices of claim 15, wherein the operations further comprise:

placing the initiator device into a geo-fence boundary modification mode in response to the sequence of 3D movements mapping to an action which changes the mode of the initiator device from a current mode to the geo-fence boundary modification mode.

20. The one or more computer storage devices of claim 15, wherein the operations further comprise:

changing a functionality of the target computing device from a first operational mode to a second operational mode in response to the sequence of 3D movements of the initiator device, wherein the target computing device is configured to perform a set of actions associated with the second operational mode in response to the change in the functionality.

* * * * *